(12) United States Patent
Tang et al.

(10) Patent No.: US 12,291,783 B2
(45) Date of Patent: May 6, 2025

(54) ENVIRONMENTAL BARRIER COATING

(71) Applicant: Raytheon Technologies Corporation, Farmington, CT (US)

(72) Inventors: Xia Tang, West Hartford, CT (US); Richard Wesley Jackson, Mystic, CT (US); James T. Beals, West Hartford, CT (US); Kenneth David Smith, East Longmeadow, MA (US)

(73) Assignee: RTX Corporation, Farmington, CT (US)

( * ) Notice: Subject to any disclaimer, the term of this patent is extended or adjusted under 35 U.S.C. 154(b) by 848 days.

(21) Appl. No.: 17/402,801

(22) Filed: Aug. 16, 2021

(65) Prior Publication Data

US 2022/0112608 A1 Apr. 14, 2022

Related U.S. Application Data

(60) Provisional application No. 63/065,784, filed on Aug. 14, 2020.

(51) Int. Cl.
*C23C 26/00* (2006.01)
*C04B 35/14* (2006.01)
(Continued)

(52) U.S. Cl.
CPC .............. *C23C 26/00* (2013.01); *C04B 35/14* (2013.01); *C04B 35/62222* (2013.01);
(Continued)

(58) Field of Classification Search
CPC ... C23C 26/00; C04B 35/14; C04B 35/62222; C04B 2235/3891; C04B 2235/9607;
(Continued)

(56) References Cited

U.S. PATENT DOCUMENTS 5,595,616 A 1/1997 Berczik
5,683,524 A 11/1997 Subramanian et al.
(Continued)

FOREIGN PATENT DOCUMENTS

CN 108048778 5/2018
EP 3611149 2/2020

OTHER PUBLICATIONS

Mendiratta, M.G., et al.; "Effect of alloying additions on the phase equilibria and oxidation in the Mo—Si—B system". Interim Report for Period Jun. 30, 1998-Jun. 30, 2000, Air Force Research Laboratory, Apr. 2001.

(Continued)

*Primary Examiner* — Laura A Auer
(74) *Attorney, Agent, or Firm* — Carlson, Gaskey & Olds, P.C.

(57) ABSTRACT

An example article according to the present disclosure includes, among other possible things, a metallic substrate, and a bond coat on the metallic substrate. The bond coat includes a matrix phase, gettering particles in the matrix phase, wherein the gettering particles are reactive with oxidants, and a dispersion of matrix modifier particles in the matrix phase. The example article also includes a diffusion barrier between the bond coat and the metallic substrate, wherein the diffusion barrier is configured to inhibit diffusion of components from the bond coat into the metallic substrate. An example composite material and method of applying a barrier to a substrate are also disclosed.

18 Claims, 2 Drawing Sheets

(51) Int. Cl.
*C04B 35/622* (2006.01)
*C04B 35/626* (2006.01)
*C04B 35/64* (2006.01)
*F02C 7/30* (2006.01)

(52) U.S. Cl.
CPC .... *C04B 35/62655* (2013.01); *C04B 35/6269* (2013.01); *C04B 35/64* (2013.01); *F02C 7/30* (2013.01); *C04B 2235/3418* (2013.01); *C04B 2235/3891* (2013.01); *C04B 2235/9607* (2013.01); *C04B 2235/9684* (2013.01); *F05D 2230/22* (2013.01); *F05D 2230/90* (2013.01); *F05D 2240/35* (2013.01); *F05D 2300/611* (2013.01)

(58) Field of Classification Search
CPC ............... C04B 2235/9684; F02C 7/30; F05D 2230/90; F05D 2300/611
See application file for complete search history.

(56) References Cited

U.S. PATENT DOCUMENTS

| | | |
|---|---|---|
| 5,693,156 A | 12/1997 | Berczik |
| 6,200,691 B1 | 3/2001 | Moore et al. |
| 6,497,968 B2 | 12/2002 | Zhao et al. |
| 6,652,674 B1 | 11/2003 | Woodard et al. |
| 7,005,191 B2 | 2/2006 | Perepezko et al. |
| 7,560,138 B2 | 7/2009 | Perepezko et al. |
| 7,763,356 B2 | 7/2010 | Berczik et al. |
| 7,951,459 B2 | 5/2011 | Tang et al. |
| 9,611,181 B2 | 4/2017 | Tang et al. |
| 9,969,655 B2 | 5/2018 | Wan et al. |
| 9,995,153 B2 | 6/2018 | Knittel et al. |
| 10,308,818 B2 | 6/2019 | Tang et al. |
| 10,329,926 B2 | 6/2019 | Lenz et al. |
| 2019/0119803 A1 | 4/2019 | Tang et al. |

OTHER PUBLICATIONS

European Search Report for European Patent Application No. 21191562.4 dated Sep. 29, 2021.

ENVIRONMENTAL BARRIER COATING

CROSS-REFERENCE TO RELATED APPLICATIONS

This application claims priority to U.S. Provisional Application Ser. No. 63/065,784, filed Aug. 14, 2020, which is hereby incorporated by reference herein in its entirety.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Components, such as gas turbine engine components, may be subjected to high temperatures, corrosive and oxidative conditions, and elevated stress levels. In order to improve the thermal and/or oxidative stability, the component may include a protective barrier coating.

SUMMARY

An example article according to the present disclosure includes, among other possible things, a metallic substrate, and a bond coat on the metallic substrate. The bond coat includes a matrix phase, gettering particles in the matrix phase, wherein the gettering particles are reactive with oxidants, and a dispersion of matrix modifier particles in the matrix phase. The example article also includes a diffusion barrier between the bond coat and the metallic substrate, wherein the diffusion barrier is configured to inhibit diffusion of components from the bond coat into the metallic substrate.

In a further embodiment of the foregoing example, the metallic substrate is a refractory metal substrate.

In a further embodiment of any of the foregoing examples, the metallic substrate comprises at least one of molybdenum, niobium, tantalum, tungsten, vanadium, chromium, zirconium, hafnium, and alloys thereof.

In a further embodiment of any of the foregoing examples, the metallic substrate comprises a high entropy metal alloy.

In a further embodiment of any of the foregoing examples, the diffusion barrier includes at least one of silicide, metal silicide, boride and borosilicide phases.

In a further embodiment of any of the foregoing examples, the diffusion barrier has a density that is higher than the density of the bond coat.

In a further embodiment of any of the foregoing examples, the density of the diffusion barrier is at least 10% higher than the density of the bond coat.

In a further embodiment of any of the foregoing examples, the article further includes a ceramic-based top coat on the bond coat.

In a further embodiment of any of the foregoing examples, the gettering particles include at least one metal silicide.

In a further embodiment of any of the foregoing examples, wherein the metal silicide includes at least one of $MoSi_2$ and $Mo_5Si_3$.

In a further embodiment of any of the foregoing examples, the matrix modifier particles enhance the mechanical stability of the bond coat.

In a further embodiment of any of the foregoing examples, the matrix modifier particles provide self-healing to the bond coat.

In a further embodiment of any of the foregoing examples, the bond coat has a first coefficient of thermal expansion and the substrate has a second coefficient of thermal expansion, and wherein the difference between the first and second coefficients of thermal expansion is less than about 3.5.

In a further embodiment of any of the foregoing examples, the article is a component of a gas turbine engine.

In a further embodiment of any of the foregoing examples, the article has at least one non-line-of-sight surface and at least one line-of-sight surface, and wherein the bond coat is disposed on the line-of-sight and the non-line-of-sight surfaces.

An example composite material according to the present disclosure includes a bond coat. The bond coat includes a matrix, a dispersion of gettering particles in the matrix, wherein the gettering particles are reactive with oxidants and include metal silicides, and a dispersion of matrix modifier particles in the matrix. The composite material also includes a diffusion barrier, wherein the diffusion barrier inhibits diffusion of components out of the bond coat.

In a further embodiment of any of the foregoing examples, the diffusion barrier is on a first side of the bond coat, and further comprising a ceramic-based top coat on a second side of the bond coat.

In a further embodiment of any of the foregoing examples, the diffusion barrier has a first density and the bond coat has a second density, and the first density is higher than the second density.

An example method of applying a barrier to a substrate according to the present disclosure includes applying a diffusion barrier to a metallic substrate, mixing matrix modifier particles, metal silicides, and matrix material in a carrier fluid to form a slurry, applying the slurry to the metallic substrate over the diffusion barrier, drying the slurry, curing the slurry, and sintering the slurry such to form a barrier on the substrate.

In a further embodiment of any of the foregoing examples, the method also includes applying a ceramic-based topcoat to the substrate.

DETAILED DESCRIPTION

Figure 1:
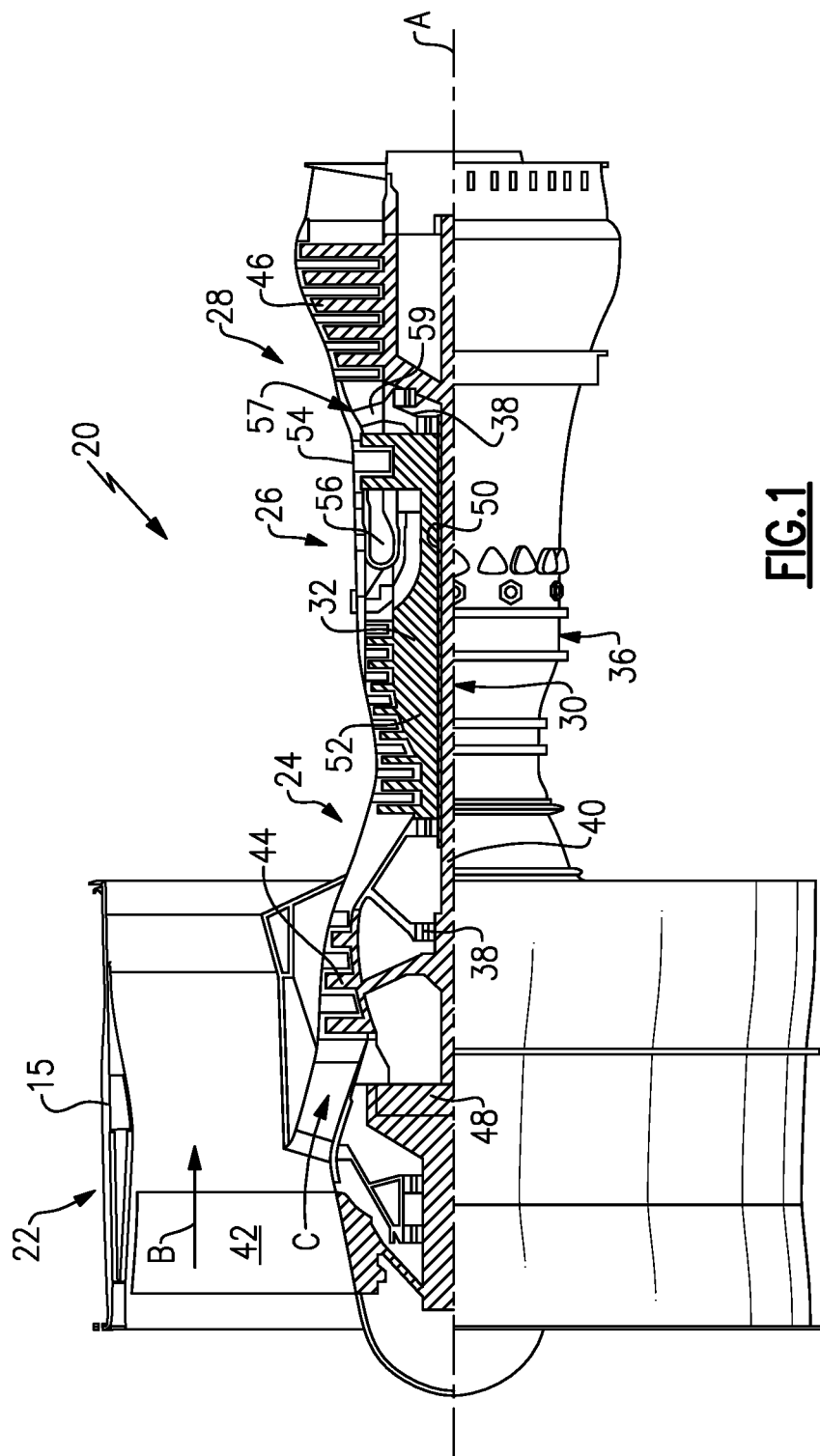
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades in the fan section 22 disclose an example gas turbine engine 20 with increased power transfer efficiency.

Figure 2:
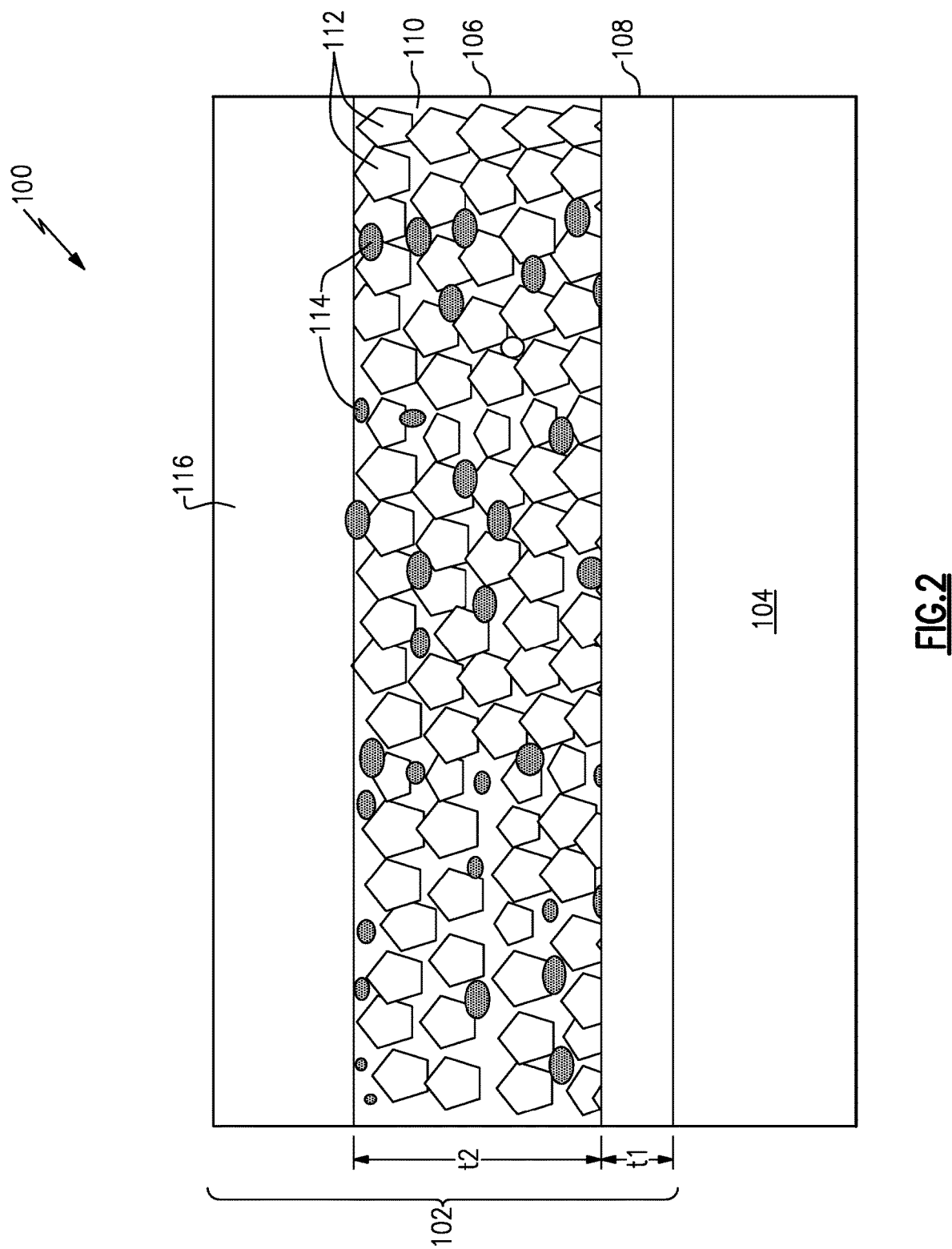
FIG. 2 illustrates an example article having a barrier layer.

FIG. 2 schematically illustrates a representative portion of an example article 100 for the gas turbine engine 20. The article 100 includes a barrier 102. The article 100 can be, for example, an airfoil in the compressor section 24 or turbine section 28, a combustor liner panel in the combustor section 26, a blade outer air seal, or other component that would benefit from the examples herein. In this example, the barrier 102 is used as an environmental barrier layer to protect an underlying substrate 104 from environmental conditions, as well as thermal conditions. The underlying substrate 104 could be a ceramic-based material, such as a ceramic matrix composite, or a metallic material. As will be appreciated, the barrier 102 can be used as a stand-alone barrier, as an outermost/top coat with additional underlying layers, or in combination with other coating under- or over-layers, such as, but not limited to, ceramic-based topcoats.

In one particular example, the underlying substrate 104 is a metallic material that is or includes refractory metals or refractory metal alloys. Example refractory metals are Mo, Nb, Ta, W, V, and Cr. The substrate 104 could also be a high entropy alloy, which is an alloy in which no single element has a concentration exceeding 50 atomic percent. High entropy alloys can include three, four, five, or more elements, some or all of which can be refractory metals. Refractory metals, refractory metal alloys, and high entropy alloys have high temperature capabilities at the operating temperatures of the engine 20, e.g., temperatures of about 1600 degrees F. or higher. The longevity and performance of refractory metal-containing components can be improved by protecting the components from certain environmental conditions with a barrier such as the barrier 102.

The barrier 102 includes a bond coat 106 and a diffusion barrier 108. The bond coat 106 includes a matrix 110, a dispersion of "gettering" particles 112, and a dispersion of matrix modifier particles 114. The matrix 110 can be or include, for example, silicon dioxide ($SiO_2$), alumina oxide, mullite, or combinations thereof. The bond coat 106 protects the underlying substrate 104 from environmental oxygen and moisture (e.g., steam). Oxygen and moisture could cause the underlying substrate 104 to oxidize, which could reduce the mechanical benefits and/or longevity of the substrate 104. This is especially true in the high-temperature operational environment of the engine 20.

The matrix modifier particles 114 can play one or more roles in enhancing the thermal stability, mechanical stability and/or longevity of the barrier 102. Unlike the gettering particles 112, which are discussed below, the matrix modifier particles 114 could be generally non-reactive with respect to oxidant species, such as oxygen or water, or are less reactant with oxidant species than the gettering particles 112. Therefore, the matrix modifier particles 114 can modify or enhance the properties of the barrier 102 even if the gettering particles 112 oxidize or degrade.

In one example, the matrix modifier particles 114 could provide "self-healing" to the barrier 102. Or alternatively, the matrix modifier particles 114 could react with oxidant species to form species that could provide self-healing to the barrier 102. Without being bound by any particular theory, the matrix modifier particles 114 exhibit some degree of flow or diffusive behavior at the operating temperatures experienced by the article 100. This flow/diffusion may allow the matrix modifier particles 114 to seal any microcracks that could form in the barrier 102, providing a "self-healing" element. Sealing the micro-cracks could prevent oxygen from infiltrating the barrier 102, which further enhances the oxidation resistance of the barrier 102.

The matrix modifier particles 114 can alternatively or additionally protect the gettering particles 112 from oxidative degradation (known as pesting) at relatively low temperatures (e.g., in the range of about 900 to 2000 degrees F.). As will be discussed in more detail below, some gettering particles 112 contain metals which can degrade in oxidative environments at this temperature range and form non-volatile components and/or non-protective oxides (e.g., oxides that generally do not block oxidant transportation through the barrier 102 because they, for example, produce non-continuous oxide layers, highly permeable oxides, or oxides that spall easily). The low temperature degradation could lead to mechanical disruptions or even catastrophic failure of the barrier 102. The matrix modifier particles 114 protect the gettering particles 112 from such degradation by inhibiting direct access of the gaseous atmosphere to the surface of the gettering particles 112. For example, the matrix modifier particles 114 can interfere with the movement of oxidants through the bond coat 106 and/or form a protective layer around the gettering particles 112.

For example substrates 104 that are metals such as refractory metal alloys, the matrix modifier particles 114 can alternatively/additionally protect the substrate 104 from pesting in the same or similar manner as discussed above with respect to the gettering particles 112.

The matrix modifier particles 114 could be crystalline or partially crystalline particles, which are strong and enhance the mechanical stability of the barrier 102.

The matrix modifier particles 114 can include one or more types of particles in order to provide one or more of the properties described above. Some example matrix modifier particles 114 are borides, silicon borides, metal borides, boron-containing oxides such as borosilicate glass (e.g., pyrex), alkaline earth aluminum silicates such as such as barium-magnesium alumino-silicate (BMAS) particles, barium strontium aluminum silicate particles, magnesium silicate particles, rare earth aluminum silicate particles, yttrium aluminum silicate particles, ytterbium aluminum silicate particles, other rare earth metal aluminum silicate particles, or combinations thereof.

The matrix modifier particles 114 can also include other types of glasses, refractory metal oxides (such as $Al_2O_3$, $HfO_2$, $HfSiO_4$, $ZrSiO_4$, or $ZrO_2$), or both. Glasses, for instance, can provide the diffusivity/flow for self-healing as described above. In general, glasses comprise a minority (e.g., less than 50%) of the matrix modifier particles 114. Refractory metal oxides, for example, can react with silica components in the matrix 110 to form silicates such as aluminum silicate, hafnium silicate, and zirconium silicate. These silicates can enhance thermal and mechanical stability and mechanical strength of the bond coat 106.

The gettering particles 112 are reactive with respect to oxidant species such as oxygen or water that could diffuse into the barrier 102. In this way, the gettering particles 112 could reduce the likelihood of those oxidant species reaching and oxidizing the substrate 104. The gettering particles 112 may also contribute to the mechanical and/or thermal strength/stability of the barrier 102 before or after oxidation. For example, the gettering particles 112 can sinter together in the high temperature operating conditions (for example, at temperatures greater than 1400 degrees C. or about 2550 degrees F.) within the barrier 102 to form a three dimensional network structure.

The gettering particles 112 include metal silicides such as refractory metal silicides. Example refractory metal silicides include $MoSi_2$, $WSi_2$, $VSi_2$, $NbSi_2$, $TaSi_2$, $TiSi_2$, $HfSi_2$, $ZrSi_2$, and $YSi_2$. The metal silicides may have high temperature resistance, e.g., they do not tend to degrade at high temperatures such as 1600 degrees F. or higher in the absence of oxidants such as oxygen and water. In some examples, the gettering particles 112 also include silicon oxycarbide (SiOC) particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. In a particular example, the gettering particles 112 comprise a majority (e.g., greater than 50%) of the refractory metal silicides.

The bond coat 106 includes, by volume, greater than 40% of the gettering particles 112. In general, the amount of gettering particles 112 is indirectly proportional to the oxygen gettering capacity of the gettering particles 112 (e.g., reactivity of the gettering particles 112 with oxygen). For instance, $MoSi_2$ has higher oxygen gettering capacity than $Mo_5Si_3$ because $MoSi_2$ contains higher silicon activity per mole of molybdenum than $Mo_5Si_3$. Therefore, less $MoSi_2$ could be used as compared to an amount of $Mo_5Si_3$ that would be needed to obtain an equivalent oxygen gettering capacity of the gettering particles 112.

In a particular example, the bond coat 106 includes, by volume, 50-90% of the gettering particles 112. In some examples, the bond coat 106 includes 1-30% of the matrix modifier particles 114. In a more particular example, the bond coat 106 includes, by volume, 1-20% of matrix modifier particles 114. In one further example, the bond coat 106 includes, by volume, 5-40% of the matrix 110 such as a silica-based matrix. In a further example, the composite material 102 includes, by volume, 1-30% of the matrix modifier particles 114, 5-40% of the matrix 110, and a balance of the gettering particles 112.

In some examples, where the substrate 104 is a refractory metal, refractory metal alloy, or high entropy alloy, significant diffusion of gettering particles 112 or components of the gettering particles 112 into the substrate 104 could occur simply by virtue of the physical proximity of the bond coat 106 and substrate 104. The diffusion barrier 108 is a dense layer of composite material containing silicide, metal silicide, metal boride and/or borosilicide phases. The diffusion barrier 108 has a density that is higher than the density of the bond coat 106. In one example, the density of the diffusion barrier 108 is at least 10% higher than the density of the bond coat 106. In a particular example, the density of the diffusion barrier 108 is greater than about 6 g/cm$^3$, whereas the bond coat 106 has a density that is less than about 6 g/cm$^3$. The diffusion barrier could contain one or more common elements with the substrate 104.

The diffusion barrier 108 has a volume fraction of the combined silicide, metal silicide, boride and/or borosilicide phases that is higher than the volume fraction of the metal silicide gettering particles 112 in bond coat 106. In one example, the combined volume fraction of silicide, metal silicide, metal boride and/or borosilicide phases in the diffusion barrier 108 is greater than about 90%. In a further example, the combined volume fraction of silicide, metal silicide, metal boride and/or borosilicide phases in the diffusion barrier 108 is greater than about 95%.

Because of the high density and high silicon and boron volume fraction, the diffusion barrier 108 discourages diffusion of metals, silicon, and boron between the bond coat 106 and the substrate 104. This diffusion could in turn reduce the effectiveness of the barrier 102 by reducing the gettering capability (e.g., oxidation resistance) of the bond coat 106 due to the reduced amount of gettering particles 112. Therefore, the diffusion barrier 108 helps to preserve the oxidation resistance properties of the bond coat 106, especially for metal-containing substrates 104. The diffusion barrier 108 can also reduce the diffusion of metal elements from the substrate 104 into the bond coat 106. Therefore, the diffusion barrier 108 helps to preserve the properties of the substrate 104.

In some examples, the diffusion barrier 108 includes metal silicides or borosilicides that have crystal structures that inhibit diffusion of metals. For example, it is known that the diffusivity of silicon through Mo5-Si1-B2 alloys is very low due to the specific lattice structure of the Mo5-Si1-B2 crystals. The diffusion barrier 108 may additionally or alternatively include refractory metals or refractory metal oxide particles such as titanium, zirconium, or oxides thereof that also inhibit diffusion. These metals or oxides reside in the grain boundaries and reduce the inter migration of metals or other elements between adjacent grains. In general, the refractory metals or refractory metal oxides will include different metals than those in the substrate 104 and gettering particles 112.

The diffusion barrier 108 has a thickness t1 that is smaller than a thickness t2 of the bond coat 106. In some examples, t1 is less 50% half of t2. In further examples, t1 is less than 25% of t2.

In another example, the gettering particles 112 are selected and dispersed in the bond coat 106 so that the bond coat 106 has a graded composition of metal elements and/or silicon between the substrate 104 and an outer surface of the bond coat 106. More particularly, the gettering particles 112 are selected and dispersed in the bond coat 106 so that there is a relatively greater concentration of silicides that contain the same elements as the substrate 104 or the diffusion barrier 108 near the diffusion barrier 108 and a relatively lower concentration of these elements at the outer surface of the bond coat 106. This graded composition can contribute to the anti-diffusion feature of the diffusion barrier 108, and can also enhance bonding between the bond coat 106 and diffusion barrier 108.

The components of the barrier 102 are selected to have compatible thermomechanical properties with the substrate 104. For example, the materials in the bond coat 106 are selected to minimize a difference between a coefficient of thermal expansion (CTE) of the substrate 104 and a CTE of the bond coat 102. The CTE of the bond coat 106 is related to the type and amount of gettering particles 112 in the bond coat 106. Because the gettering particles 112 make up the majority of the bond coat 106 and the bond coat 106 makes up the majority of the barrier 102, the type and amount of gettering particles 112 are the largest contributors to the overall CTE of the barrier 102. Still, in general, CTE follows the rule of mixtures. One example article 100 includes a high entropy alloy substrate 104, which also follows the rule of mixtures in terms of CTE. In this example, the bond coat 106 could contain a mixture of metal silicides gettering particles 112 and matrix 110 to reach an appropriate CTE to match the CTE of the substrate 104.

In general, materials that have common metallic components have more similar CTE. Further, in general, metal silicides tend to have higher CTE than the respective metal alone. For example, for molybdenum-based substrates 104, gettering particles 112 that are molybdenum disilicide ($MoSi_2$) will have higher CTE to the molybdenum-based substrate 104. The CTE of an example silica-based matrix 110 is lower than the CTE of $MoSi_2$ and the molybdenum-based substrates 104. Since CTE follows the rule of mixture, the composite bond coat 106 that contains both $MoSi_2$ and silica-based matrix 110 has lower CTE than the CTE of $MoSi_2$, bringing the CTE of the bond coat 106 closer to the CTE of the substrate 104. This leads to a reduced CTE difference between the bond coat 106 and the substrates 104.

In general, the lower the difference between the CTE of the bond coat 106 and the CTE of the substrate 104 (e.g., the more similar the CTE values), the higher the delamination resistance between the barrier 102 and the substrate 104. A higher delamination resistance corresponds to a stronger bond between the barrier 102 and the substrate 104 over a wider range of temperatures. Furthermore, a higher delamination resistance reduces the likelihood of cracking in the barrier 102, which enables lower amounts of flowable/diffusive matrix modifier particles 114 to be used. Lower amounts of flowable/diffusive matrix modifier particles 114 generally provides a more creep-resistant barrier 102.

The matrix 110 can also be selected to reduce the CTE difference between the bond coat 106 and the substrate 104. In one particular example, the substrate 104 includes niobium or niobium based alloys, which have a CTE close to the CTE of some metal silicides, such as molybdenum disilicide ($MoSi_2$). A matrix 110 with a higher CTE, such as mixed silica and alumina, mullite or combinations thereof can be used to preserve the overall CTE of the bond coat 106 as compared to a silica-based matrix 110, that has a very low CTE, in order to maintain a similar CTE of the bond coat 104 and the substrate 104.

In one example, a difference between the CTE of the bond coat 106 and the CTE of the substrate 104 is less than about 4. In a further example, the difference is less than about 1.7.

In one particular example, the gettering particles 112 are primarily a first refractory metal silicide, and a difference between the CTE of the first refractory metal silicide gettering particles 112 and the CTE of the substrate 104 is less than about 3.5. In a further example, the difference is less than about 1.

The composition of the diffusion barrier 108 may also be selected to have thermocompatibility with the substrate 104. For example, a difference between the CTE of the substrate 104 and a CTE of the diffusion barrier 108 can be less than about 3. In a further example, the difference is less than about 1.

In some examples, the barrier 102 includes a ceramic-based topcoat 116 interfaced with the outer surface of the bond coat 106. As an example, the ceramic-based top coat 116 can include one or more layers of an oxide-based material. The oxide-based material can be, for instance, hafnium-based oxides, zirconium-based oxides, ytterbium-based oxides, yttrium-based oxides (such as hafnia, hafnium silicate, ytterbium oxide, ytterbium disilicates silicate, ytterbium monosilicates, yttria stabilized zirconia or gadolinia stabilized zirconia, yttrium oxide, yttrium disilicates silicate, yttrium monosilicates,), or combinations thereof, but is not limited to such oxides. The topcoat 116 contributes to improved thermal and environmental protection to the substrate 104, for example, by resisting the infiltration of steam into the bond coat 106, and protects the bond coat 106 from material recession that can be caused by steam at high temperatures.

Like the bond coat 106, the topcoat 116 can also be selected for thermocompatibility with the substrate 104. For example, a difference between the CTE of the substrate 104 and a CTE of the topcoat 116 can be less than about 2. In a further example, the difference is less than about 1.

Example components 100 will now be described.

Example 1: a first example article 100 includes a molybdenum-based substrate 104, such as a Mo—Si—B or Mo—Ti—Zr alloys. The gettering particles 112 in the example bond coat 106 include molybdenum silicides such as $MoSi_2$, $Mo_5Si_3$, or combinations thereof. In a particular example, the gettering particles 112 comprise a majority $Mo_5Si_3$. In a particular example, the gettering particles 112 comprise a majority of $MoSi_2$ or $Mo_5Si_3$, or a combination thereof. The CTE of molybdenum is 4.8, the CTE of $MoSi_2$ is 8.2, and the CTE of $Mo_5Si_3$ is 6.7. The diffusion barrier 108 includes one or more molybdenum silicides, boride and/or borosilicide, such as Mo5-Si1-B2 alloys.

Example 2: a second example article 100 includes a refractory-metal-based substrate 104, such as Nb, Ta, W and V metals and alloys thereof. The gettering particles 112 include one or more molybdenum silicides and/or one or more refractory metal silicides that have common metal(s) with the metal(s) in the substrate 104. The diffusion barrier 108 includes one or more refractory metal silicides and borides that have common metal(s) with the metal(s) in the substrate 104.

The bond coat 106 can be prepared using a slurry coating method. Slurries can be prepared by mixing components such as gettering particles 112, matrix modifier particles 114, and matrix 110 material such as $SiO_2$ or Ludox (a source colloidal $SiO_2$) with water using agitation or ball milling. Sol-gel derived $SiO_2$ can also be used as matrix 110 material with alcohol as a solvent. Various slurry coating methods such as painting, dipping, slurry flowing, and spraying can be used to metallic substrates. Slurry coating can thus be used to apply the bond coat 106 to all required surfaces, including non-line-of-sight surfaces of the article 100, such as interior cooling channels. Coatings formed from slurry are dried at room temperature and cured at 150-300° C. for about 5-60 minutes. During the heating, cross-linking of the colloidal silica occurs. This coating process can be repeated to apply the bond coat 106 in multiple layers. The bond coat 106 is first heat treated in inert atmosphere at 1000° C. to 1350° C. for at least one hour, followed by final sintering at 1500° C. to 1600° C. in air for at least one hour.

Prior to applying the bond coat 106, the diffusion barrier 108 can be applied to the substrate 104 using a packed cementation technique as would be known in the art. In general, packed cementation includes providing a densely-packed layer of material such as metallic material on the substrate 104, and infiltrating silicon and/or boride into the layer to provide a dense silicon/boron rich layer. The diffusion barrier 108 can also be applied by a fused slurry method. For example, a slurry can be prepared by mixing components, such as metals, silicon, boron, metal silicides and borides with water or organic solvent and a binder. The slurry can be applied on the substrate 104 by spray, dipping, or flow methods, for example. The diffusion barrier 108 forms by heat treatment in inert atmosphere at about 1000-1600 degrees C. Upon application of the bond coat 106, which includes sintering at relatively high temperatures, as discussed above, the diffusion barrier 108 further reacts with the substrate 104 to form a thermodynamically stable bond.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article comprising:
a metallic substrate; and
a bond coat on the metallic substrate, the bond coat including:
a matrix phase,
gettering particles in the matrix phase, wherein the gettering particles are reactive with oxidants, and
a dispersion of matrix modifier particles in the matrix phase; and
a diffusion barrier between the bond coat and the metallic substrate, wherein the diffusion barrier is configured to inhibit diffusion of components from the bond coat into the metallic substrate.

2. The article as recited in claim 1, wherein the metallic substrate is a refractory metal substrate.

3. The article as recited in claim 1, wherein the metallic substrate comprises at least one of molybdenum, niobium, tantalum, tungsten, vanadium, chromium, zirconium, hafnium, and alloys thereof.

4. The article as recited in claim 1, wherein the metallic substrate comprises a high entropy metal alloy.

5. The article as recited in claim 1, wherein the diffusion barrier includes at least one of silicide, metal silicide, boride and borosilicide phases.

6. The article as recited in claim 1, wherein the diffusion barrier has a density that is higher than the density of the bond coat.

7. The article as recited in claim 6, wherein the density of the diffusion barrier is at least 10% higher than the density of the bond coat.

8. The article as recited in claim 1, further comprising a ceramic-based top coat on the bond coat.

9. The article as recited in claim 1, wherein the gettering particles include at least one metal silicide.

10. The article as recited in claim 9 wherein the metal silicide includes at least one of $MoSi_2$ and $Mo_5Si_3$.

11. The article as recited in claim 1, wherein the matrix modifier particles enhance the mechanical stability of the bond coat.

12. The article as recited in claim 1, wherein the matrix modifier particles provide self-healing to the bond coat.

13. The article as recited in claim 1, wherein the bond coat has a first coefficient of thermal expansion and the substrate has a second coefficient of thermal expansion, and wherein the difference between the first and second coefficients of thermal expansion is less than about 3.5.

14. The article as recited in claim 1, wherein the article is a component of a gas turbine engine.

15. The article as recited in claim 14, wherein the article has at least one non-line-of-sight surface and at least one line-of-sight surface, and wherein the bond coat is disposed on the line-of-sight and the non-line-of-sight surfaces.

16. A composite material comprising:
   a bond coat, the bond coat comprising:
      a matrix,
      a dispersion of gettering particles in the matrix, wherein the gettering particles are reactive with oxidants and include metal silicides, and
      a dispersion of matrix modifier particles in the matrix; and
   a diffusion barrier, wherein the diffusion barrier inhibits diffusion of components out of the bond coat.

17. The composite material as recited in claim 16, wherein the diffusion barrier is on a first side of the bond coat, and further comprising a ceramic-based top coat on a second side of the bond coat.

18. The composite material as recited in claim 16, wherein the diffusion barrier has a first density and the bond coat has a second density, and the first density is higher than the second density.

* * * * *